United States Patent [19]
Ohta

[11] 4,232,350
[45] Nov. 4, 1980

[54] TAPE CASSETTE

[75] Inventor: Teruo Ohta, Sendai, Japan

[73] Assignee: Sony Corporation, Tokyo, Japan

[21] Appl. No.: 21,615

[22] Filed: Mar. 19, 1979

[30] Foreign Application Priority Data

Mar. 20, 1978 [JP] Japan .................................. 53-30995

[51] Int. Cl.³ .............................................. G11B 23/08
[52] U.S. Cl. ..................................... 360/132; 242/199
[58] Field of Search ........................ 360/132; 242/199

[56] References Cited

U.S. PATENT DOCUMENTS

| | | | |
|---|---|---|---|
| 3,601,654 | 8/1971 | Long et al. | 360/132 |
| 3,635,414 | 1/1972 | Patel | 242/55.19 A |
| 3,991,956 | 11/1976 | Macmida | 242/199 |
| 4,130,848 | 12/1978 | Amano et al. | 360/132 |
| 4,138,700 | 2/1979 | Russell | 360/132 |

FOREIGN PATENT DOCUMENTS 2618069 11/1977 Fed. Rep. of Germany .
50-25519 3/1975 Japan .

*Primary Examiner*—Robert S. Tupper
*Attorney, Agent, or Firm*—Lewis H. Eslinger; Alvin Sinderbrand

[57] ABSTRACT

In a tape cassette in which a guide pin, a guide roller and a bracket guide within the housing are engaged, in succession, by tape extending from a coil thereof rotatable within the housing with the tape engaging the guide pin and guide roller at sides thereof facing away from the coil, entwining of the tape with the guide pin due to loosening of the outer turns of the tape coil is prevented by providing an L-shaped member extending between the bracket guide and the guide pin at the side of the guide roller facing toward the coil with an acute angle included between angularly related arms of the L-shaped member opening toward the guide roller.

12 Claims, 8 Drawing Figures

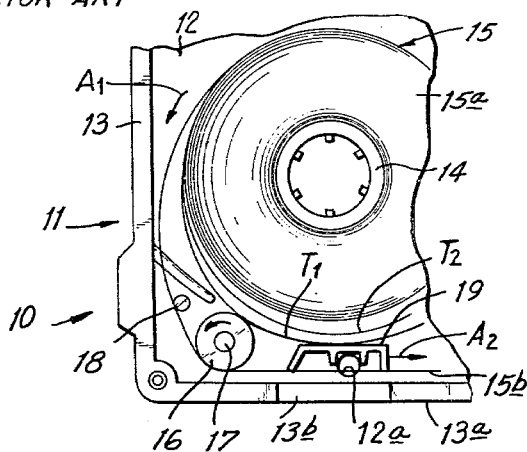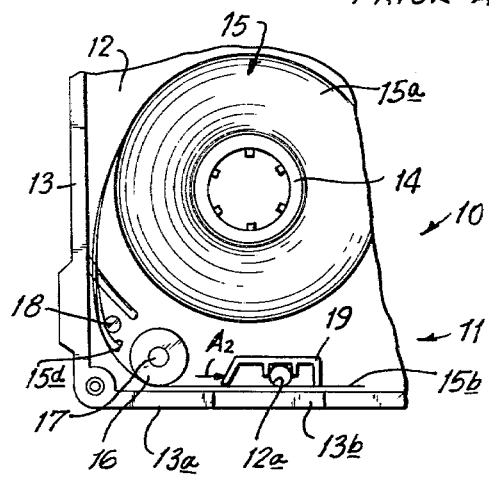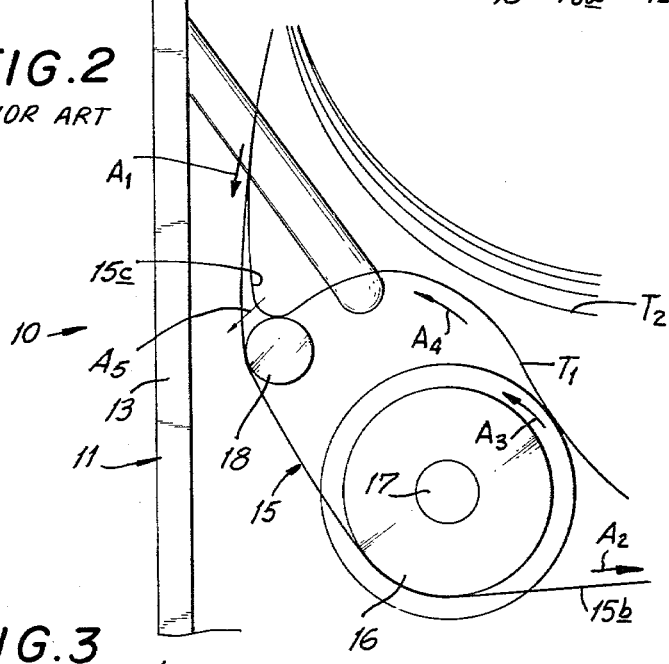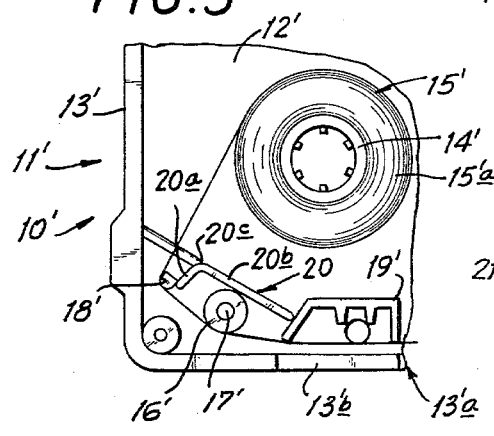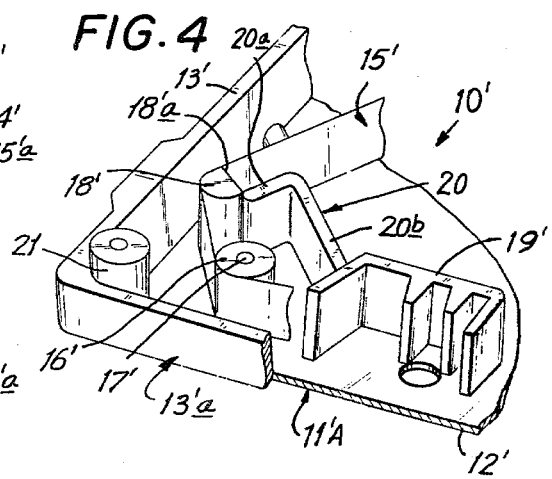

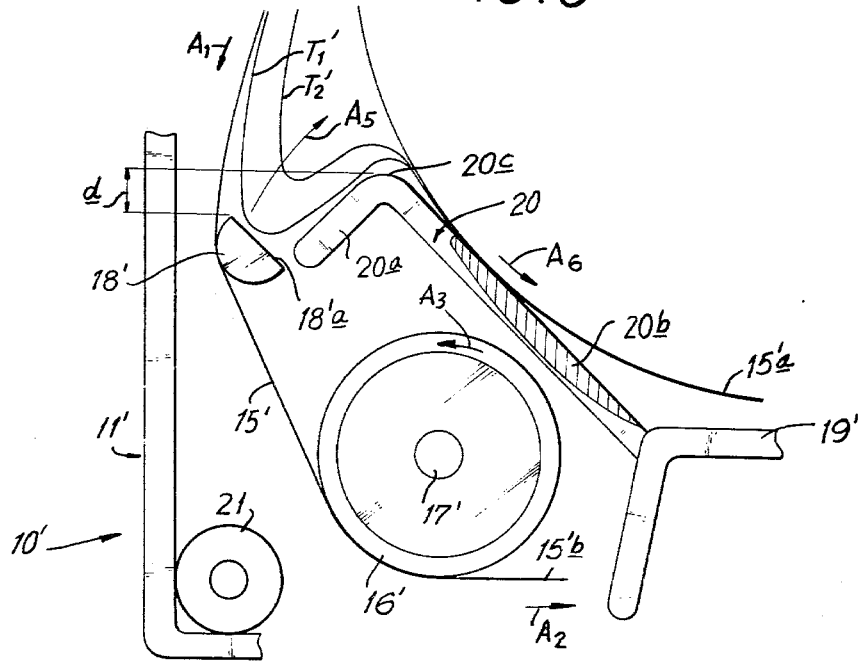
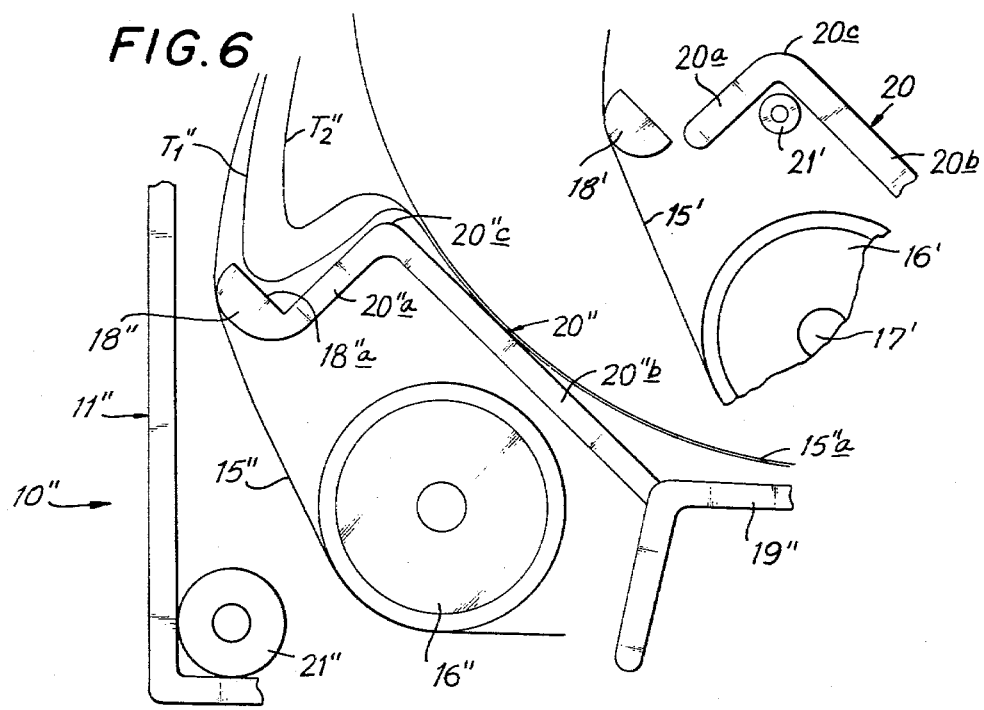

TAPE CASSETTE

BACKGROUND OF THE INVENTION

1. Field of the Invention

This invention relates generally to tape cassettes, and more particularly is directed to improvements in a tape cassette for preventing entwining of the tape with a guide structure which determines the path of tape movement within the cassette housing.

2. Description of the Prior Art

In a conventional compact tape cassette, for example, of the type CP-II, which satisfies EIA standard RS-399A, a substantially flat, rectangular housing has supply and take-up reels or winding cores rotatably disposed therein in side-by-side relation, and a magnetic tape is secured at its ends to the cores and is wound thereon to provide coils of the tape on the respective cores, with the tape between such coils being guided in a path having a portion extending along or parallel to the front side of the cassette housing. Such front side of the housing is formed with a number of openings so that, when the cassette is operatively positioned in a suitable magnetic tape recording and/or reproducing apparatus, in which position winding spindles extend through apertures in the bottom wall of the cassette housing and engage the winding cores, while a recording/reproducing head can reach through one of the openings in the front side of the cassette housing for engagement with the tape therebehind and a pressure roller can extend through another of the openings in the front side of the housing for pressing the tape against a capstan which projects upwardly into the cassette housing and is rotated for driving or transporting the tape when the latter is pressed thereagainst by the pressure roller. In a conventional compact tape cassette, the guiding means for determining the path of the tape between the coils thereof on the supply and take-up reels or cores includes guide rollers disposed within the housing adjacent the opposite ends of the front side of the housing, and being engaged by the tape at the sides of the guide rollers facing away from the adjacent coils. Furthermore, in most existing conventional compact tape cassettes, a guide pin is disposed within the cassette housing adjacent each guide roller for engagement with the tape of a location along the latter between the respective guide roller and the adjacent coil, and a bracket guide is provided within the cassette housing in back of each of the front openings thereof which is intended to receive a pressure roller so that each bracket guide can ensure proper engagement of the tape by the pressure roller and capstan.

In a compact tape cassette, as aforesaid, the turns of tape making up each of the coils may become loosened due to uncontrolled turning of the reels or cores, particularly when the cassette is not in use. When a tape coil becomes loosened in a conventional compact tape cassette, the driving of the tape, for example, as by the cooperative action of a pressure roller and capstan in a magnetic tape recording and/or reproducing apparatus in the direction to unwind the tape from the loosened coil can result in so-called "tape entwining", that is, the tape becomes entwined or wrapped around the guiding means therefor adjacent the loosened coil. When such tape entwining occurs, further transportation of the tape is blocked and, if the driving of the tape by the pressure roller and capstan is not discontinued immediately upon the developement of excessive resistance to transportation of the tape, the tape may break or, at least, the recording and reproducing characteristics of the tape will be seriously deteriorated. Thus, tape entwining has been a serious problem in conventional compact tape cassettes.

OJBECTS AND SUMMARY OF THE INVENTION

Accordingly, it is an object of this invention to prevent tape entwining in a compact tape cassette.

More particularly, it is an object of this invention to provide a compact tape cassette with simple and inexpensive means by which tape entwining can be positively avoided therein without limiting or restricting the use of the tape cassette in magnetic tape recording and/or reproducing apparatus, that is, without requiring the use of the tape cassette in an apparatus which is specifically adapted therefor.

In accordance with an aspect of this invention, in a tape cassette comprising a housing, at least one coil of tape wound on a core rotatable in the housing and a guide structure including at least a guide roller engaged by the tape extending from the coil at the side of the roller facing away from the coil; a shield member is disposed within the cassette housing adjacent each guide roller at the side of the latter facing toward the coil so that, upon loosening of the turns of the tape making up such coil, the shield member prevents contact of the guide roller with the outermost loosened turn.

In a preferred embodiment of this invention in which the tape being unwound from each coil engages, in succession, with a guide pin, the respective guide roller and a bracket guide, the shield member for preventing contact of such guide roller with the outermost loosened turn of the coil is L-shaped and extends between the bracket guide and the guide pin, and such L-shaped member has angularly related arms which include an acute angle therebetween opening generally toward the guide roller.

It is further a feature of this invention to provide each guide pin, as aforesaid, with a plane surface facing toward the adjacent coil substantially at right angles to the adjacent one of the arms of the L-shaped shield member.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIGS. 1A and 1B are fragmentary plan views of a portion of a conventional compact tape cassette with the top wall of its housing removed so as to illustrate the manner in which tape entwining occurs therein;

FIG. 2 is a fragmentary enlarged view further illustrating the manner in which tape entwining occurs in the conventional compact tape cassette;

FIG. 3 is a fragmentary top plan view similar to that of FIGS. 1A and 1B, but showing a compact tape cassette according to an embodiment of the present invention which is also shown with its top wall removed;

FIG. 4 is a fragmentary perspective view for specifically illustrating a shield member provided in the tape cassette of FIG. 3 in accordance with this invention;

FIG. 5 is a fragmentary enlarged view similar to that of FIG. 2, but illustrating the manner in which the shield member provided in the tape cassette according to this invention; as shown on FIGS. 3 and 4, is effective to avoid tape entwining;

FIG. 6 is a fragmentary enlarged view similar to that of FIG. 5, but showning another embodiment of the present invention; and FIG. 7 is still another fragmentary enlarged view illustrating a further embodiment of this invention.

DETAILED DESCRIPTION OF THE PREFERRED EMBODIMENTS

Before proceeding with a detailed description of embodiments of this invention, reference will be made to FIGS. 1A and 1B to promote an understanding of the problems encountered in a conventional compact tape cassette 10 and the manner in which such problems are solved by the present invention. The conventional compact tape cassette 10 is shown to generally comprise a substantially rectangular housing 11 having a bottom wall 12 and a top wall (not shown) with a peripheral wall 13 extending therebetween, and a pair of winding cores 14 (only one of which is shown) rotatable within housing 11 in side-by-side relation to each other. A magnetic tape 15 is connected, at its ends, to the cores 14, respectively, and is wound on cores 14 to form respective coils 15a on the latter with a length of the tape 15 extending therebetween. The length of tape 15 between coils 15a is guided in a path having a portion 15b extending along or parallel to peripheral wall 13 at the front side 13a of cassette housing 11. Such front side 13a of the housing is formed with a number of openings, for example, as at 13b, through which tape 15 in path portion 15b is exposed.

When the conventional compact tape cassette 10 is operatively positioned in a suitable magnetic tape recording and/or reproducing apparatus, winding spindles (not shown) extend through apertures (not shown) in bottom wall 12 of the cassette housing and engage winding cores 14, while a recording/reproducing head (not shown) can reach through one of the openings 13b in the front side of the cassette housing for engagement with the tape 15 therebehind and a pressure roller (not shown) can extend through another of the openings 13b for pressing the tape against a capstan (not shown) projecting upwardly through a hole 12a in bottom wall 12 and being rotated for driving or transporting the tape when the latter is pressed against the capstan by the pressure roller.

In the illustrated conventional compact tape cassette 10, the guiding means for determining the path of the tape 15 between the coils 15a thereof on the supply and take-up reels or cores 14 includes guide rollers 16 rotatably mounted, as on pins 17, within housing 11 adjacent the opposite ends of the front side 13a thereof. In most existing conventional compact tape cassettes, a guide pin 18 is disposed within the cassette housing 11 adjacent each guide roller 16 for engagement with the tape at a location along the latter between the respective guide roller 16 and the adjacent coil 15a, and a bracket guide 19 is molded or otherwise provided within the cassette housing 11 in back of each of the front openings 13b which is intended to receive a pressure roller so that each bracket guide 19 can ensure proper engagement of the tape by a pressure roller and capstan extending through the adjacent openings 13b and 12a, respectively. It will be appreciated that, if the direction of movement of the tape from the coil 15a on the core 14 shown in FIG. 1A is indicated by the arrows $A_1$ and $A_2$, the guide pin 18 and bracket guide 19 shown on FIGS. 1A and 1B are engageable with the tape 15 at locations therealong which are respectively upstream and downstream from the respective guide roller 16 considered in respect to said direction of movement of the tape from the illustrated coil 15a. It will be seen that the tape 15 passes each guide roller 16 and side thereof which faces away from the coil 15a on the adjacent core 14.

In the above-described conventional compact tape cassette 10, the outer turns of tape making up each of the coils 15a may become loosened, for example, as shown with respect to the outer turns $T_1$ and $T_2$ on FIGS. 1A and 2, due to uncontrolled turning of the reels or cores 14, particularly when the cassette 10 is not in use. When a tape coil becomes loosened in the conventional compact tape cassette 10, the outermost loosened turn $T_1$ of the coil 15a may contact the peripheral surface of guide roller 16 at the side of the latter facing the adjacent core 14. Thereafter, driving of the tape, for example, by the cooperative action of a pressure roller and capstan in a magnetic tape recording and/or reproducing apparatus, for moving the tape in the direction of the arrows $A_1$ and $A_2$ on FIG. 1A, that is, in the direction to unwind the tape from the loosened coil, can result in so-called "tape entwining". More particularly, and as shown on FIG. 2, when the tape 15 is driven in the direction of the arrows $A_1$ and $A_2$ to unwind the tape from a loosened coil, the adjacent guide roller 16 is turned in the counterclockwise direction, as viewed on FIG. 2, so that the peripheral surface of roller 16, at the side of the latter facing toward the adjacent reel or core 14, is moving generally in the direction back toward the adjacent guide pin 18, as indicated by the arrow $A_3$. Accordingly, the outermost loosened turn $T_1$ of the coil, in contacting the peripheral surface of roller 16 at the side of the latter facing the coil on adjacent core 14, is propelled in the direction indicated by the arrow $A_4$ so as to form a loop in the tape, as indicated at 15c. As a result, of the propelling of turn $T_1$ in the direction of the arrow $A_4$ by its contact with rotating roller 16, the tape loop 15c is urged against the run of tape 15 between guide pin 18 and the adjacent coil 15a, which tape run is moving in the direction of the arrow $A_1$ on FIG. 2. Thus, as a result of the forces imparted frictionally to the tape loop 15c in the direction of the arrows $A_1$ and $A_4$, the bending radius of tape loop 15c is progressively decreased, that is, the tape loop 15c is flattened and is urged in the direction of the arrow $A_5$ into the nip between the tape 15 and guide pin 18, for example, as indicated at 15d on FIG. 1B. It will be appreciated that the loop indicated at 15d is drawn along with the tape moving in the direction of the arrow $A_2$ and thus becomes entwined or wrapped around guide pin 18 and/or guide roller 16. When such tape entwining occurs, further substantial unwinding of the tape from coil 15a, and hence further transportation of the tape, is blocked so that, if the driving of the tape by the pressure roller and capstan is not discontinued immediately upon the development of excessive resistance to transportation of the tape, the tape may break, or at least, the recording and reproducing characteristics of the tape will be seriously deteriorated, as by sharp creasing or folding of the tape.

Referring now to FIGS. 3–5 in which the several parts of a compact tape cassette 10′ according to this invention which correspond to the above-described parts of a conventional cassette 10 are identified by the same reference numerals, but with a prime (') appended thereto, it will be seen that such cassette 10' according to this invention differs substantially from the conventional or known cassette 10 by the presence, in the cassette housing 11', of a shield member 20 disposed adjacent each guide roller 16' at the side of the latter facing toward the adjacent coil 15'a on a core 14'. Thus, even when the outer turns of tape coil 15'a become substantially loosened, shield member 20 prevents contact of guide roller 16', at the side of the latter shown to be moving in the direction of the arrow $A_3$ on FIG. 5, with the outermost loosened turn $T_1$ of the adjacent coil.

In the illustrated embodiment of this invention, the shield member 20 for preventing contact of the guide roller 16' with the outermost loosened turn of the adjacent coil 15'a is L-shaped and extends between the adjacent guide pin 18' and bracket guide 19'. Moreover, the L-shaped shield member 20 is shown to have angularly related arms 20a and 20b which include an acute angle therebetween opening generally toward the adjacent guide roller 16'. The L-shaped shield member 20, which may be molded integrally with bottom wall 12' of housing 11' preferably has a rounded corner 20c at the connection or confluence of arms 20a and 20b, and the arm 20b desirably extends approximately at right angles to a line extending through the axes of the respective winding core 14' and guide roller 16', as shown particularly on FIG. 3. Further, each guide pin 18' in cassette 10' according to this invention preferably has a substantially semi-circular cross-section so as to provide a plane surface portion 18'a on the guide pin facing toward the adjacent coil 15'a and being substantially at right angles to the adjacent arm 20a of the L-shaped shield member 20.

With the foregoing arrangement according to this invention, when the outer turns of the tape coil become loosened, for example, as at $T'_1$ and $T'_2$ on FIG. 5, such loosened turns of the tape come into contact with the rounded corner 20c of shield member 20 by which a loop is formed in each of the loosened outer turns. By reason of the movement of the driven tape unwound from the coil in the direction of the arrow $A_1$, the loop in the outermost loosened turn $T'_1$ is frictionally driven into the angular pocket defined by plane surface portion 18'a of guide pin 18' and arm 20a. The tape loop in the outer turn $T'_1$ rebounds from plane surface portion 18'a in the direction of the arrow $A_5$ so that the loop in the outermost turn $T'_1$ does not entwine around guide pin 18', but rather is propelled in the direction of arrow $A_5$ so as to be progressively reduced in size. More particularly, when the loop in the outermost turn $T'_1$ is frictionally urged by the movement of the tape in the direction of the arrow $A_1$ so as to rebound from plane surface portion 18'a of the guide pin, the tape of outermost turn $T'_1$ slips relative to guide pin 18' and also relative to shield member 20 as that the tape of the outermost turn $T'_1$ is frictionally drawn along, in the direction of arrow $A_6$, by the inner unloosened turns of the tape coil. As the outermost turn $T'_1$ is frictionally drawn along in the direction of the arrow $A_6$, it will be apparent that the loop in such outermost turn is progressively reduced in size in the direction of the arrow $A_5$, that is, the looseness of the terms is reduced until the respective tape coil 15'a is restored to its normal condition without loosened outer turns.

It will be appreciated that, when the outermost turn $T'_1$ of the tape coil 15'a is loosened, it tends to adhere to the tape being unwound and moving in the direction of the arrow $A_1$ past guide pin 18'. However, the contact of the loop formed in outermost turn $T'_1$ with the arm 20a of shield member 20 blocks the movement of the outermost turn $T'_1$ in the direction of the arrow $A_1$ so that the outermost turn of the tape coil 15'a does not adhere to the run of the tape moving in the direction of the arrow $A_1$ and does not advance therewith.

It has been found that the effectiveness of shield member 20 in preventing the undesired entwining of the tape in a compact tape cassette of standard dimensions is enhanced when the distance d (FIG. 5) from the rounded corner 20c of shield member 20 to the plane surface portion 18'a of guide pin 18' measured substantially in the direction of the path of the tape unwound from the coil 15'a ranges from approximately 0.5 mm to 2.0 mm.

It will be appreciated that the presence of shield member 20 limits loosening of the outermost layer of tape in coil 15'a and thereby further tends to prevent entwining of the tape about guide pin 18'. Furthermore, shield member 20, in embracing the respective guide roller 16' at the side of the latter facing toward coil 15'a, is effective to prevent entwining of the loosened outer turns of the tape coil with guide roller 16'.

Although there is a gap or space between guide pin 18' and shield member 20 in the embodiment of the invention shown on FIGS. 3–5, the guide pin and the shield member provided according to this invention may be formed integrally with each other, as at 18" and 20", respectively, on FIG. 6. In the compact tape cassette 10" according to this invention, as shown on FIG. 6, the various parts thereof are seen to be identified by the same reference numerals used to identify the corresponding parts in FIG. 5, but with a double-prime (") appended thereto. By the integral connection of arm 20"a of shield member 20" with guide pin 18", the correct threading of the tape 15" about guide pin 18" is ensured, that is, there is no possibility of erroneously threading the tape into a gap between the guide pin and shield member when assembling the tape cassette.

As in the case of conventional compact tape cassettes, the housing 11' of cassette 10' or 10" according to this invention is preferably comprised of similar upper and lower housing parts (of which only the lower housing part 11'A is shown, for example, on FIG. 4). Such lower housing part 11'A may include a bottom wall 12' of the housing and a peripheral flange extending along the margin of bottom wall 12' and mating with a similar flange along the periphery of the top wall of the upper housing part (not shown) for defining the peripheral wall 13' of housing 11'. The mounting axle or pin 17 + for each guide roller 16', each guide pin 18' and bracket guide 19' and each shield member 20 or 20" may be molded integrally with the lower housing part 11'A, as shown. Further, tapped bosses 21 may be formed as integral parts of lower housing part 11'A at the four corners of the latter so that, when the upper and lower housing parts are superposed in assembling cassette 10', screws passing through suitably located holes in the upper housing part can be threadably received in tapped bosses 21 of the lower housing part for securing together the upper and lower housing parts of the assembled cassette.

However, in a compact tape cassette according to this invention, the tapped bosses 21 normally disposed at the corners of the cassette housing which are at the opposite ends of the front side of the latter may be desirably repositioned so that each of such tapped bosses 21' is located within the angle included by the arms 20a and 20b of a respective one of the shield members 20, as shown particularly on FIG. 7. Such relocated tapped bosses 21', which project a relatively large distance above the bottom wall of the cassette housing, are disposed within the path of the tape 15' for avoiding interference with the assembling of the cassette according to this invention, particularly when such assembling is automatically effected. Furthermore, in such case, the portions of the peripheral wall of the cassette housing extending along the front side thereof are preferably defined only by flange elements integral with the upper housing part so that the mentioned flange elements will also avoid interference with the automatic assembling of the cassette, particularly prior to the final stage in which the upper housing part is secured to the lower housing part.

It should be noted that, although the occurrence of undesirable tape entwining may run as high as approximately 70% under certain conditions of use with conventional compact tape cassettes, under similar conditions of use of compact tape cassettes according to this invention, the occurrence of tape entwining has been greatly reduced to the order of a few percent or less.

Having described a number of specific embodiments of this invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. In a tape cassette comprising a housing, a coil of wound tape rotatable in said housing, and guide means including a guide roller disposed in said housing and being engaged by tape extending from said coil and passing said guide roller at the side thereof facing away from said coil, a guide pin and a bracket guide engaged with said tape at locations therealong which are respectively upstream and downstream from said guide roller considered in respect to the direction of movement of said tape from said coil, with the tape also passing said guide pin at the side of the latter which faces away from said coil; the improvement which comprises an L-shaped shield member extending between said bracket guide and said guide pin within said housing at the side of said guide roller which faces toward said coil so that, upon loosening of the turns of said tape making up said coil, said shield member prevents contact of said guide roller with the outermost loosened turn, said shield member having angularly related arms which include an acute angle therebetween opening generally toward said guide roller.

2. A tape cassette according to claim 1; in which said guide pin has a plane surface portion facing toward said coil substantially at right angles to the adjacent one of said arms of the L-shaped shield member.

3. A tape cassette according to claim 2; in which said guide pin has a substantially semi-circular cross-section.

4. A tape cassette according to claim 2; in which said L-shaped shield member has a rounded corner connecting said arms.

5. A tape cassette according to claim 4; in which said rounded corner of the L-shaped shield member is spaced from said plane surface portion of the guide pin substantially in the direction of the path of the tape from said coil to said guide pin by a distance ranging from approximately 0.5 mm to 2.0 mm.

6. A tape cassette according to claim 1; in which said L-shaped shield member is integral with said guide pin at the one of said arms adjacent said guide pin.

7. A tape cassette according to claim 6; in which said guide pin has a substantially semi-circular cross-section to provide a plane surface portion on the guide pin facing toward said coil and being substantially at right angles to said adjacent one of the arms of said L-shaped shield member.

8. A tape cassette according to claim 1; in which said housing is comprised of molded upper and lower housing parts, said guide pin, guide bracket, L-shaped shield member and a mounting axle for said guide roller are all molded integrally with one of said housing parts, and said one of the housing parts further has a tapped boss formed in said acute angle of the L-shaped shield member for receiving a fastener by which said housing parts are secured to each other.

9. In a tape cassette comprising a substantially rectangular housing having a peripheral wall with openings therein along one side of the housing, a pair of cores rotatable within said housing in side-by-side relation to each other, a magnetic tape connected at its ends to said cores, respectively, and being wound on said cores to form coils on the latter with a length of said tape extending between said coils, and guide means for guiding said length of the tape in a path having a portion thereof extending along said one side of the housing for exposure at said openings, said guide means including a guide roller disposed adjacent each of the opposite ends of said one side of the housing to define said portion of the path between said rollers, each of said rollers being normally engaged by said tape over a portion of its circumference facing away from an adjacent one of said cores and, for each of said guide rollers, a guide pin and a bracket guide engaged with said tape at locations therealong which are respectively upstream and downstream from the respective guide roller considered in respect to the direction of movement of the tape from the coil on the adjacent core, with the tape also passing said guide pin at the side of the latter which faces away from the coil on said adjacent core; the improvement which comprises a shield member within said housing adjacent each of said guide rollers at the side of the respective guide roller facing toward said adjacent one of the cores so that, upon loosening of the turns of the tape making up said coil on said adjacent core, said shield member prevents contact of said guide roller with the outermost loosened turn, each said shield member being L-shaped, extending between said bracket guide and guide pin associated with the respective guide roller, and having angularly related arms which include an acute angle therebetween opening generally toward said respective guide roller.

10. A tape cassette according to claim 9; in which each said guide pin has a plane surface portion facing toward the coil on the adjacent core substantially at right angles to the adjacent one of said arms of the respective L-shaped shield member.

11. A tape cassette according to claim 10; in which each said guide pin has a substantially semi-circular cross-section.

12. A tape cassette according to claim 10; in which each said L-shaped shield member has a rounded corner connecting said arms.

* * * * *